March 1, 1938.  R. A. POAGE ET AL  2,109,648
V-TYPE BRAKE FOR MOTOR VEHICLES
Filed Jan. 28, 1937   2 Sheets-Sheet 1
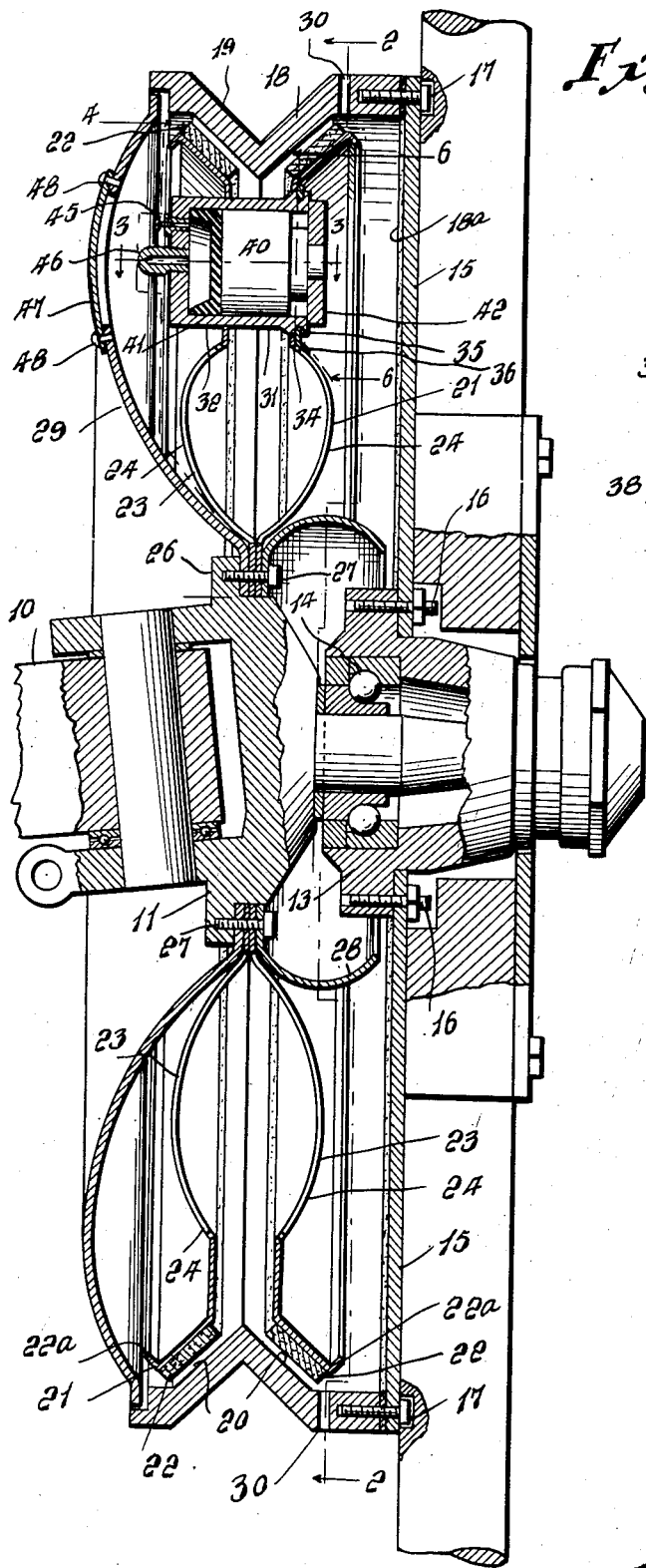
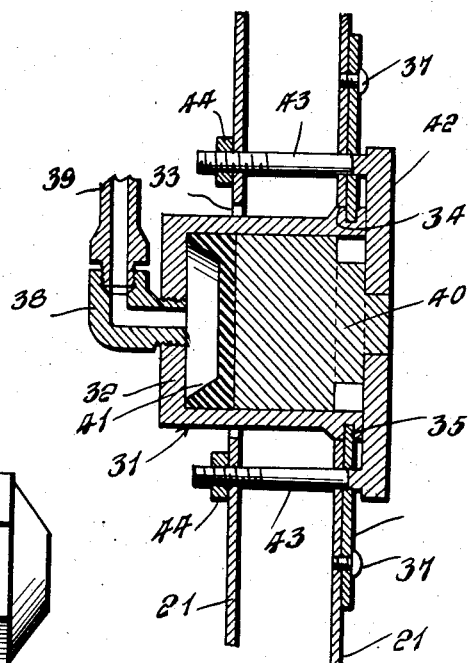
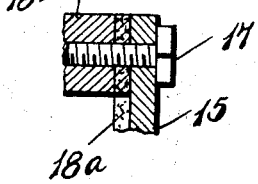
Inventors
R.A.Poage,
M.Z.Poage
By L. F. Randolph
Attorney March 1, 1938. R. A. POAGE ET AL 2,109,648
V-TYPE BRAKE FOR MOTOR VEHICLES
Filed Jan. 28, 1937 2 Sheets-Sheet 2
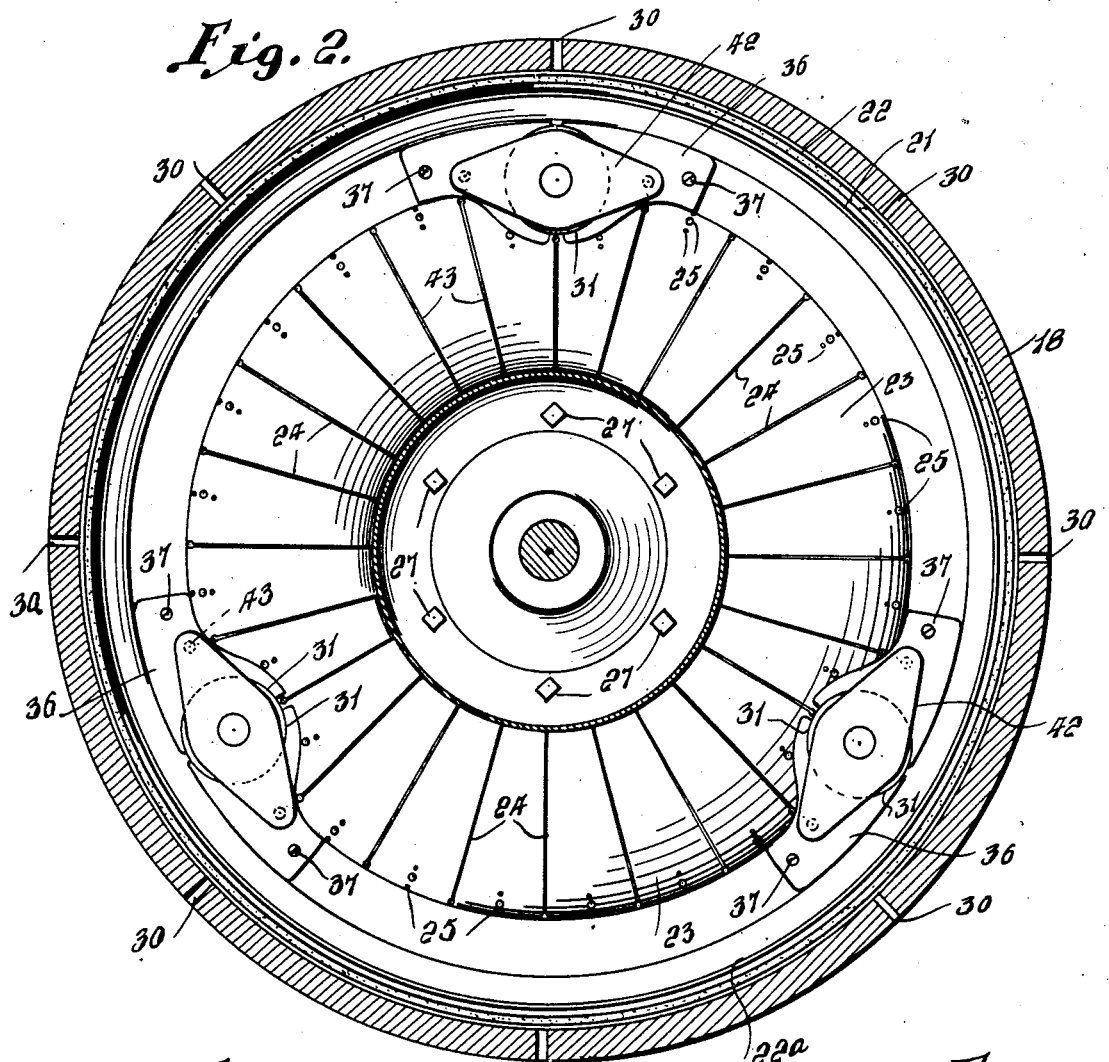
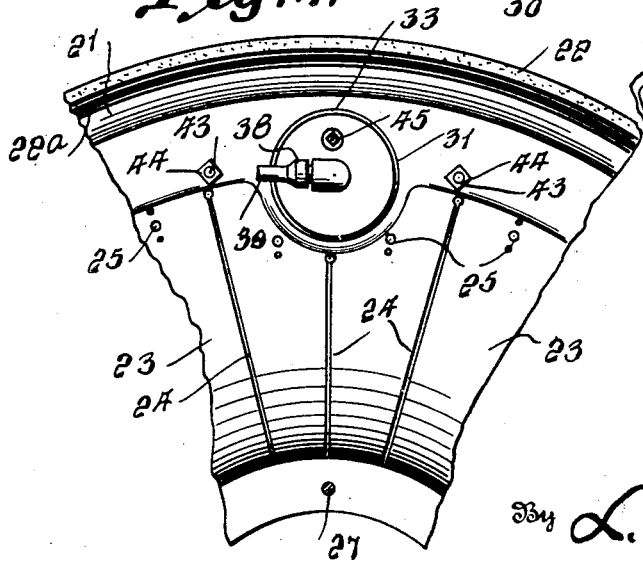
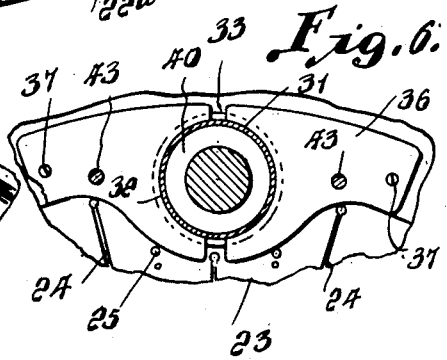
Inventors
R. A. Poage,
M. Z. Poage
By L. F. Kavanagh
Attorney Patented Mar. 1, 1938

2,109,648

UNITED STATES PATENT OFFICE 2,109,648

V-TYPE BRAKE FOR MOTOR VEHICLES

Robert A. Poage, Panhandle, Tex., and Marlin Z. Poage, Tallahassee, Fla.

Application January 28, 1937, Serial No. 122,844

4 Claims. (Cl. 188—152)

This invention relates to a novel braking mechanism primarily adapted for use on the wheels of motor vehicles and aims generally to provide an improved construction wherein braking elements are disposed on opposite sides of a V-shaped braking surface of a brake drum, the latter being rotatable and the former non-rotatable and adapted to clasp the drum, and more specifically to provide a construction which is improved over that disclosed in our co-pending application Serial No. 28,738 filed June 27, 1935, and allowed March 30, 1936.

The present invention concerns novel means for securing the hydraulic elements in place, novel brake shoes and a novel dust plate, enabling the shoes to be more easily removed and increasing the turning radius of the spindle.

Various additional objects and advantages will become apparent from a consideration of the description following taken in connection with accompanying drawings illustrating an operative embodiment.

In said drawings:—

Figure 1 is a view substantially in central vertical section illustrating our improvements in connection with a vehicle wheel;

Figure 2 is a vertical section taken substantially on the plane of line 2—2 of Figure 1;

Figure 3 is a detail section taken substantially on the plane of line 3—3 of Figure 1;

Figure 4 is a detail section taken substantially on the plane of line 4—4 of Figure 1;

Figure 5 is an enlarged fragmental sectional view of the means for securing the cover plate to the brake ring, and Figure 6 is a detail section taken on the line 6—6 of Figure 1.

Referring specifically to the drawings wherein like reference characters designate like or similar parts, 10 designates the front axle of an automobile to which a spindle 11 is pivoted in the usual manner as at 12 and on which a wheel, by means of a hub 13, and interposed bearing structure 14, is journaled. The parts described are conventional and are illustrated to enable an understanding of the construction and operation of our improvements.

A plate 15 is removably fastened as by means of bolts 16 to the hub 13 and secured laterally thereto as by means of bolts 17, is an annular brake drum 18. Interposed between the plate 15 and brake drum 18, secured by the bolts 17, is a gasket 18a of asbestos or other heat insulating material, which is instrumental in preventing "bell mouthing". Said drum 18 has a central annular depressed portion 19 which is thus integral with it, forming an interior V-shaped braking surface 20, thus having oppositely inclined braking surfaces.

Co-acting with said oppositely inclined braking surfaces are shoes 21, preferably being lined or faced as at 22 with usual friction lining, which is adapted to directly engage the V-shaped braking surface when applied, but which is normally spaced therefrom as shown in Figure 1. It will be noted that the brake shoes are oppositely inclined.

Said brake shoes 21 are each preferably made in a single piece of sheet metal which is stiffened or reenforced by flanges or curls 22a along the marginal edges thereof. Such shoes are annular and are oppositely bulged outwardly as at 23 to increase their resilience and they are further slit or slotted as at 24 along radial lines in order to enhance their resilience. In addition, holes or openings 25 are provided through the shoes in order to equalize the flexure of the shoes.

The shoes 21 are secured to a portion of the spindle structure 11, against a flange 26 thereon by means of bolts or screws 27 passing therethrough and which also pass through and secure in place a cup 28 and a dust plate 29. Said cup 28 is adapted to hold and deflect surplus grease which is adapted to escape from the structure through ports 30 in the drum 18.

The shoes 21 at their braking surfaces 22 are adapted to engage the braking surfaces 20 of the drum 18 through the action of hydraulic devices 31 disposed equidistantly about the brake mechanism and in any desired number, for instance three as shown. These devices comprise cylinders 32 extending loosely through openings 33 in one of the brake shoes and rigidly connect it to the other brake shoe, fitting openings 34 in the latter and outwardly thereof having continuous grooves 35 engaged by anchor plates 36 screwed or otherwise fastened as at 37 to the adjacent brake shoe. The opposite ends of the cylinders are closed and have elbows 38 connected therein to which a conduit or hose 39, preferably flexible, is attached, which conduits may be oil conduits, and which are adapted to form part of an hydraulic operating mechanism.

Pistons 40 are slidable in the cylinders and in engagement with the work face thereof are rubber cups 41, intimately fitting the parts so as to seal in the operating fluid. Said pistons are rigidly attached to securing plates 42, which seal the adjacent end of the cylinders when engaged therewith. Said attaching plates 42 are parts of U-shaped clamps or bolts completed by bolt members 43 integral with the plates and extending through openings in the anchor plates 36, loosely through openings in the brake shoes, and being held in place by nuts 44 screw threaded thereon.

Bleeder screws or devices may be provided on the cylinders at 45 for operation or control to rid the system of air.

It will be noted that the dust plates 29 are curved so as to greatly increase the turning radius of the spindle and it will also be noted that it has an opening 46 therethrough opposite each hydraulic device 31, to permit access to such devices, the openings preferably being closed by removable plates 47 secured in place by screws or the equivalent at 48.

It will be clear that fluid is admitted through the pipe 39 into the cylinder in order to apply the brakes, the cylinders and pistons moving relatively to each other so that the shoes at the linings will clasp the braking surfaces 20.

It is obvious that one of the brake devices may be applied to each or any desired number of the wheels of a vehicle.

We claim as our invention:—

1. In braking mechanism of the class described, a support, a brake drum thereon having an inwardly pointing V-shaped portion providing diverging braking surfaces, shoes having portions in diverging relation co-acting with said surfaces, said shoes having a multiplicity of slits to enhance the resilience thereof, a dust plate on one side of the shoes, a cup on the other side of the shoes, fastening means passing through the brake shoes, dust plate and cup, said cup serving to hold and deflect surplus grease, and said drum having openings therethrough for the escape of deflected grease.

2. In braking mechanism of the class described, a support, a brake drum thereon having an inwardly pointing V-shaped portion providing diverging braking surfaces, shoes having portions in diverging relation co-acting with said surfaces, said shoes having a multiplicity of slits to enhance the resilience thereof, and a hydraulic device operable to apply the shoes to the drum, said device comprising a cylinder, a piston operable in the cylinder, said cylinder having an exterior groove, anchor plates entering said groove, a securing plate for the piston, and bolt members on said securing plate passing through the anchoring plates and shoes.

3. In braking mechanism of the class described, a support, a brake drum thereon having an inwardly pointing V-shaped portion providing diverging braking surfaces, shoes having portions in diverging relation co-acting with said surfaces, said shoes having a multiplicity of slits to enhance the resilience thereof, and a hydraulic device operable to apply the shoes to the drum, said device comprising a cylinder, a piston operable in the cylinder, said cylinder having an exterior groove, anchor plates entering said groove, a securing plate for the piston, bolt members on said securing plate passing through the anchoring plates and shoes, nuts on the bolts beyond the last shoe, and heat insulating means between the support and the brake drum.

4. In braking mechanism of the class described, a support, a brake drum thereon, shoes coacting with the drum, a hydraulic device operable to apply the shoes to the drum, said device comprising a cylinder, a piston operable in the cylinder, said cylinder having an exterior groove, anchor plate entering said groove, a securing plate for the piston, and bolt members on said securing plate passing through the anchoring plate and shoes.

ROBERT A. POAGE.
MARLIN Z. POAGE.